(No Model.) 3 Sheets—Sheet 2.

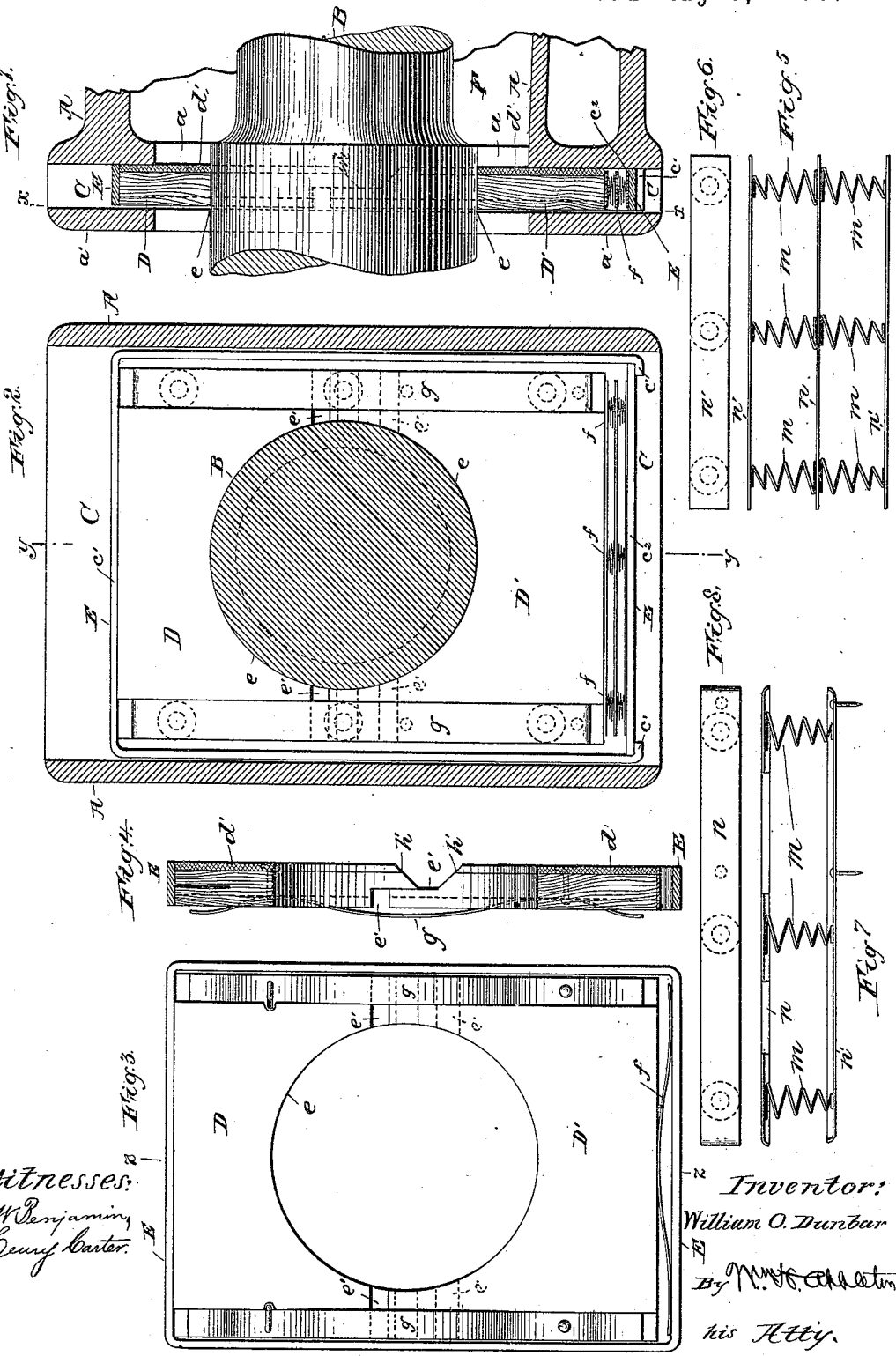

W. O. DUNBAR.
JOURNAL BOX FOR CAR AXLES.

No. 427,303. Patented May 6, 1890.

Witnesses:
C. W. Benjamin
Henry Carter

Inventor:
William O. Dunbar
By Wm. H. Appleton
his Atty.

(No Model.) 3 Sheets—Sheet 3.
W. O. DUNBAR.
JOURNAL BOX FOR CAR AXLES.
No. 427,303. Patented May 6, 1890.
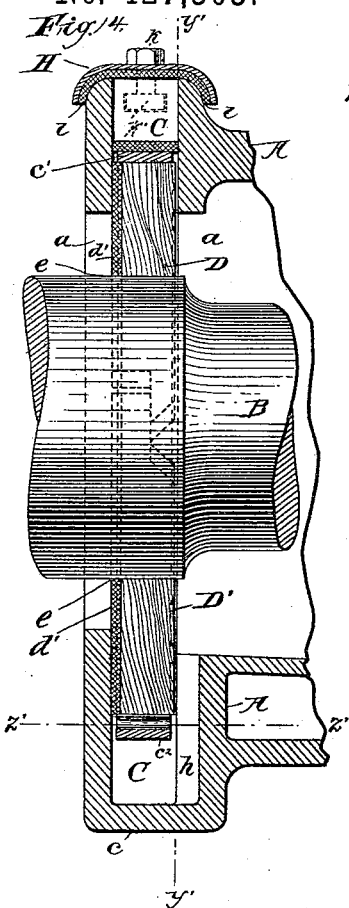
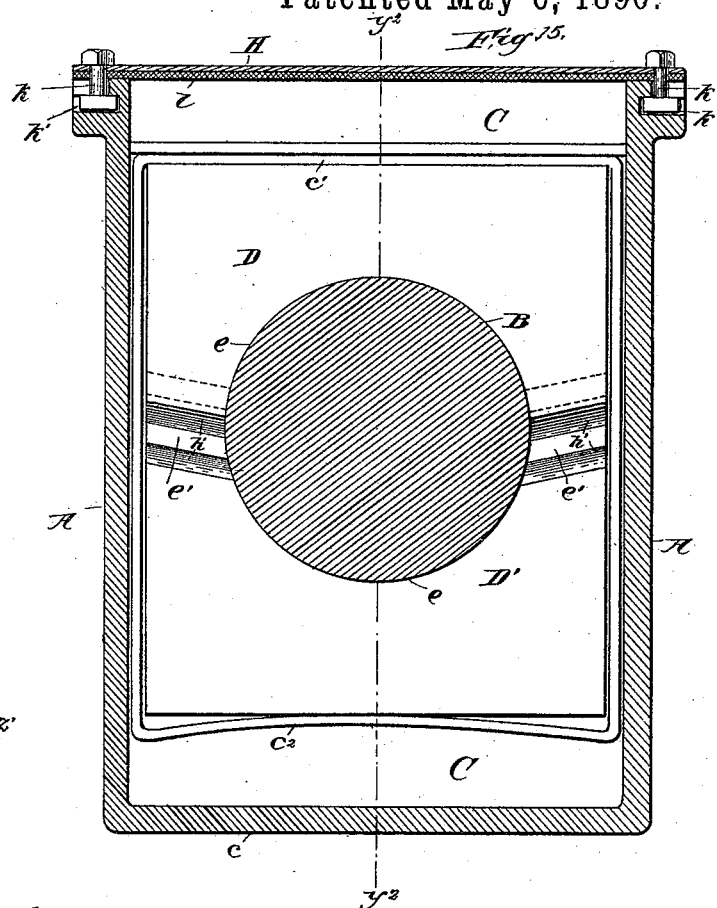
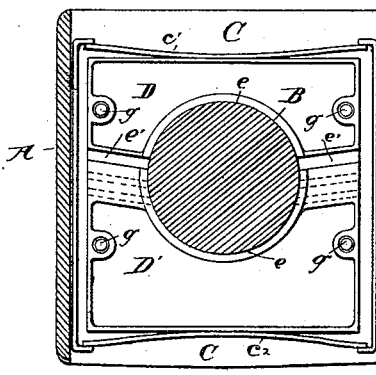
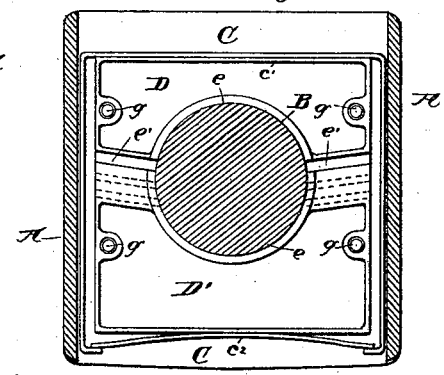
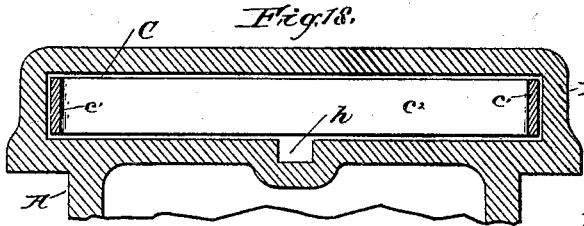
Witnesses:
C. W. Benjamin,
Henry Carter.
Inventor:
William O. Dunbar
By Wm H. Appleton
his Atty.
THE NORRIS PETERS CO., PHOTO-LITHO., WASHINGTON, D. C.

UNITED STATES PATENT OFFICE.

WILLIAM O. DUNBAR, OF ALTOONA, PENNSYLVANIA.

JOURNAL-BOX FOR CAR-AXLES.

SPECIFICATION forming part of Letters Patent No. 427,303, dated May 6, 1890.

Application filed June 29, 1889. Serial No. 316,050. (No model.)

*To all whom it may concern:*

Be it known that I, WILLIAM O. DUNBAR, a citizen of the United States, and a resident of Altoona, county of Blair, and State of Pennsylvania, have invented certain new and useful Improvements in Journal-Boxes for Car-Axles, of which the following is a specification.

My invention, while shown applied in connection with the forms of journal-box illustrated and described in Letters Patent of the United States Nos. 392,593 and 397,901, which were granted to me November 13, 1888, and February 19, 1889, respectively, is designed for general application to any of the well-known forms of boxes of this class, its object being to provide means whereby the escape of oil or other lubricant from the journal-box at the point where the axle enters it is prevented, and the dripping of such oil or lubricant upon the car-wheel, should any escape, be obviated.

To this end my invention consists, first, in a peculiarly-constructed dust and lubricant guard for use in connection with the journal-box; second, in the construction of the journal-box itself; third, in the novel combination of such dust and lubricant guard with the journal-box, and, fourth, in various other constructions and combinations of parts subsidiary thereto, all as will hereinafter more fully appear.

Figure 9:
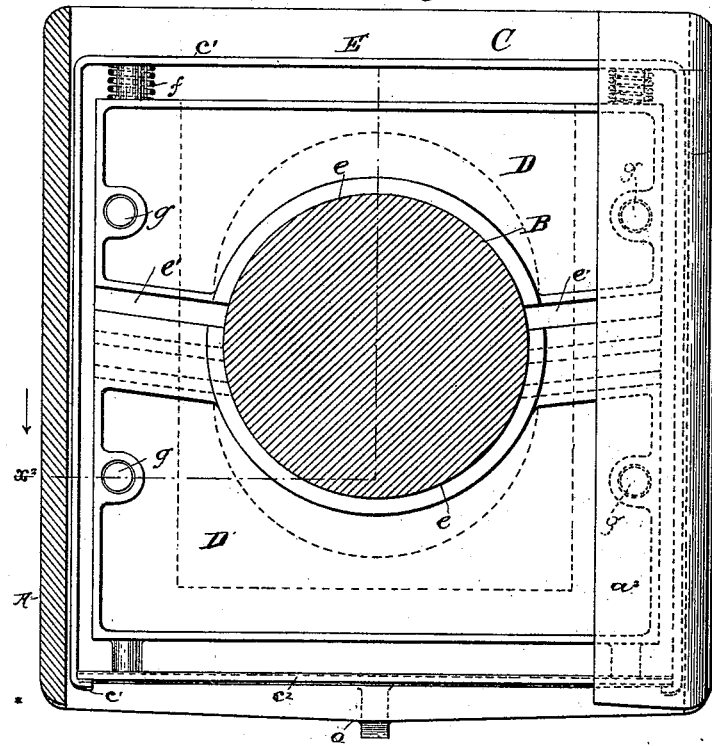
Figure 10:
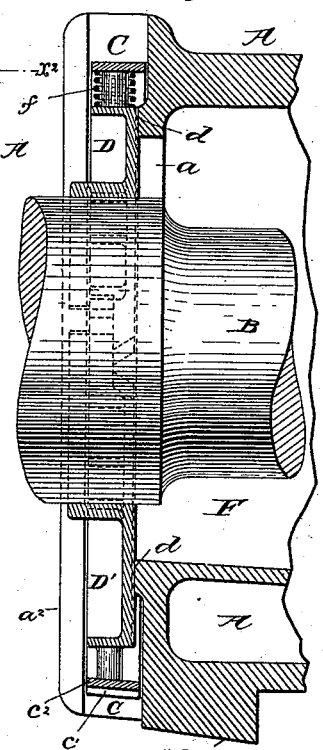
Figure 11:
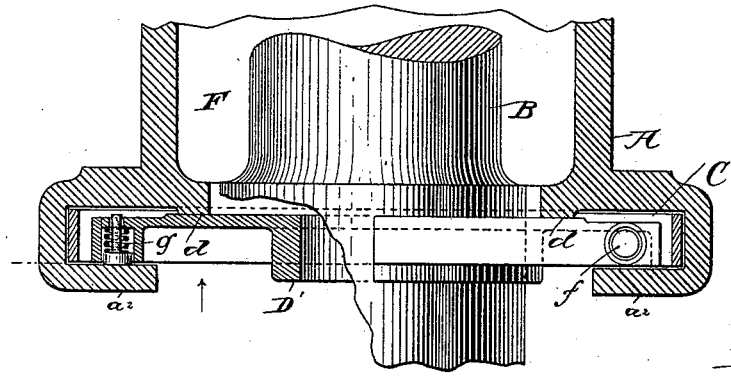
Figure 12:
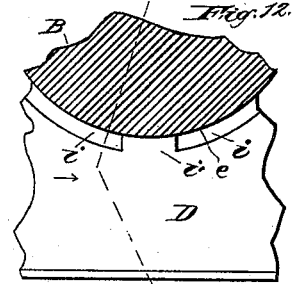
Figure 13:
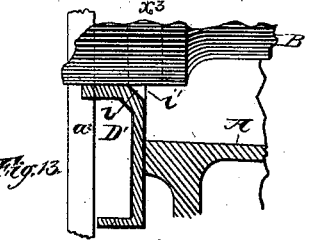

Referring to the accompanying drawings, which form a part of this specification, Figures 1 and 2 are vertical longitudinal and transverse sections, respectively, of a journal-box, showing my invention applied thereto, Fig. 1 being taken in the plane $y\ y$ of Fig. 2, and Fig. 2 being taken in the plane $x\ x$ of Fig. 1, looking toward the right in that figure; Fig. 3, an elevation of one form of the dust and lubricant guard detached; Fig. 4, a vertical section taken in the plane of $z\ z$ of Fig. 3; Figs. 5 and 6, a side elevation and plan, respectively, of an arrangement of springs for holding the concave edges of the dust and lubricant guard in contact with the journal or axle; Figs. 7 and 8, similar views, respectively, of an arrangement of springs for holding the dust and lubricant guard against the side of its pocket; Fig. 9, a rear end elevation of a slightly-modified form of journal-box with my invention applied thereto, one of the flanges which co-operates with the dust and lubricant guard being removed, and the journal or axle being shown in section; Fig. 10, a vertical longitudinal section of the journal-box with its dust and lubricant guard, taken in a plane passing axially through Fig. 9, the journal or axle being shown in elevation; Fig. 11, a sectional plan of the same parts, taken on the line $x^2\ x^2$ of Fig. 9; Fig. 12, an end elevation of a fragment of that portion of the dust and lubricant guard shown in Fig. 10 that is located below the journal or axle, which latter is shown in section; Fig. 13, a vertical longitudinal section of such fragment and a portion of the journal-box, taken in the plane $x^3\ x^3$ of Fig. 12, a portion of the journal or axle being shown in elevation; Figs. 14 and 15 longitudinal vertical and transverse sections, respectively, of a still further modified construction of journal-box with my invention applied thereto, Fig. 14 being taken in the line $y^2\ y^2$ of Fig. 15, and Fig. 15 being taken on the line $y'\ y'$ of Fig. 14, looking toward the left in said figure; Figs. 16 and 17, vertical transverse sections of the journal-box and journal, taken in the plane $y'\ y'$ of Fig. 14, showing modified constructions of springs for holding the parts of the dust and lubricant guard in contact with the journal or axle; and Fig. 18, a sectional detail taken in the plane of $z'\ z'$ of Fig. 14, looking downward.

In all the figures like letters are employed to designate corresponding parts.

A indicates a journal-box, which in its general construction is or may be of any ordinary or preferred form, the particular design of box, however, selected by me for the exemplification of my invention being that shown and described in the later of the Letters Patent aforementioned, to which reference may be had. This box is provided in its rear with the usual orifice $a$ for the reception of the axle B, upon which the journal is formed, and also with a pocket C, arranged transversely of the same, for a purpose to be hereinafter explained. The construction of these pockets may be modified in various ways. As shown in Figs. 14 and 15, it is provided with a close bottom c, while in Figs. 1, 2, 9, 10, 11, 16, and 17 this bottom is removed, leaving the pocket entirely open at that point, and, in addition thereto, this latter construction is still further modified in some instances by removing the back $a'$ and employing in place thereof the inwardly-projecting flanges $a^2$ $a^2$, as shown, for example, in Figs. 9, 10, and 11.

D D' indicate the guard through the instrumentality of which the dust is excluded from the journal-box A and the escape of the lubricant contained therein prevented. This guard in the preferred form of construction is made in two halves or sections, as shown, each of which is provided in its inner edge with a semicircular recess $e$ of the proper dimensions to adapt it to accurately fit and half-way surround the axle B at the place where it comes in contact with it, and the two sections are held pressed together and upon the axle by means of a band E encircling them. In the manufacture of these guards various materials may be employed. I prefer, however, to make use of wood or metal as being the best suited to the purpose; and in order to provide for taking up any wear which may result from the action of the axle when in rotation upon the walls of the recess $e$ the inner edges of the sections, instead of abutting, are halved together, each of such edges being provided with a suitable rabbet $e'$, which is disposed opposite the tongue on the other, and extending backward therefrom sufficiently far to permit of the two sections approaching each other, while maintaining at all times a tight joint between them. As thus constructed, the guard, with its encircling band, is arranged in the pocket C, and its sections are held pressed against the axle B to insure a tight joint being formed around the latter by means of springs $f$, which may either form a part of the encircling band, as shown in Figs. 16 and 17, or be distinct therefrom and interposed between it and the sections, as shown in Figs. 1, 2, 3, 9, 10, 14, and 15.

When used in connection with a pocket having a closed bottom, the encircling band E may be made integral throughout, and its under side, or its under and upper sides, may be cambered, as shown in Figs. 15 and 16, to act as a spring to force the sections toward and upon the axle; or such sides may be made straight, as illustrated in Fig. 3, and an independent spring $f$ employed for a like purpose; but however constructed the guard in connection with which the band is employed will be supported upon the axle and be free to move with such band as a whole in the dust-guard pocket both vertically and laterally. I prefer, however, to employ my guard in connection with a pocket that is unprovided with a bottom, as provision is thereby made for truing up the side or face of the pocket against which the guard rests, and the encircling band E can be so constructed as to permit of removing the guard from the pocket without the necessity of withdrawing the journal from its bearing. With this form of pocket the encircling band may be made in two parts, the upper $c'$ of which extends across the top of the guard and down the two ends thereof, with its free extremities bent inward, and the lower of which parts $c^2$ extends beneath the guard and rests upon such inturned ends, as shown in Figs. 2, 9, and 17; or, as a modification thereof, such band may be made in four parts, as shown in Fig. 16. The means whereby the sections of the guard are held in contact with the axle when these last-mentioned forms of pocket and bands are employed are the same as those made use of in connection with the preceding constructions, and either the top, the bottom, or both the top and bottom of the band may be cambered, or independent springs interposed between the band and sections may be employed for the purpose, as desired.

In Figs. 1 and 2 the open bottom pocket is shown as provided with a back $a'$; but in Figs. 9, 10, and 11 the back is omitted and inwardly-projecting flanges $a^2$ $a^2$ are substituted in lieu thereof. When the guard is made of wood, it may be found desirable to employ the former construction, as a greater amount of support is afforded it thereby; but when metal guards are used the latter construction will be adopted, since, while sufficient support is given to the guard, greater facility is afforded for truing up the surfaces against which it abuts. In the manufacture of these guards D D' for use in connection with pockets having open bottoms the sections thereof will preferably be made of such width with respect to the depth of the pocket as to insure that the under portion of the encircling band E shall extend down into such pocket to near its lower end, as illustrated in Figs. 1, 2, 9, 10, 16, and 17, so that by simply raising the journal-box a short distance, by means of a jack or otherwise, the under portion $c^2$ of the encircling band will protrude from the lower end of the pocket, when such portion of the band may be disengaged from the inturned ends of the upper portion $c'$, and the entire guard, with the remainder of the encircling band, removed and afterward replaced without necessitating the withdrawal of the journal from its bearing or disarranging in any way the remaining parts of the journal-box. At the same time that the parts are thus made removable the sides of the upper portion $c'$ of the band, with their inturned ends, are held from spreading by the walls of the pocket against which they bear, and the under portion $c^2$ of such band is made of a length equal to the distance between the inner sides of the upper portion, or substantially so, whereby the two portions when assembled become practically a continuous band, and the inner portion thereof cannot drop or fall out except when the box is raised, as above explained.

To insure at all times a tight joint between the guard and the walls of the pocket, and thereby prevent ingress of dust or other foreign substance to the journal-box and the escape of the lubricant therein contained, I find it convenient to employ springs $g$, which, acting between the guard and the walls of one side of the pocket, force such guard over against the other, which may be made as a projecting hub, as shown at $d$ in Figs. 10 and 11, if desired, and securely hold it in that position, leather, felt, or other suitable packing being secured to the bearing-surface of the guard, if preferred, as shown, for example, at $d'$ in Figs. 1, 4, and 14. When the guard is used in connection with a pocket having an open bottom, this joint will be formed between the side of the guard and the side of the pocket next the lubricant chamber or receptacle F of the journal-box, as shown in Figs. 1, 2, 9, 10, 11, 16, and 17; but when used in connection with a pocket having a closed bottom such joint will be preferably formed on the opposite side, as illustrated in Fig. 14, the escape of the lubricant passing into the pocket from the chamber or receptacle when this arrangement is employed being prevented by extending the walls of the back $a'$ of the pocket upward toward the axle to a higher elevation than are the walls on the opposite side, and the return of such lubricant to the chamber from the pocket being facilitated by means of the groove or channel $h$, extending upward from the bottom of the latter. (See Figs. 14 and 18.)

The inner or meeting edges of the sections composing the guard may be either straight, as shown in Figs. 1, 2, 3, and 4, or inclined downward from their ends toward a point midway their lengths, as shown in Figs. 9, 10, 11, 14, 15, 16, and 17, and these edges, however made, may be beveled back on the inner or side next the lubricant chamber or receptacle F of the sections, as shown at $h'$. I prefer, however, to make these edges in the inclined form, especially when employed in connection with pockets having an open bottom, as the lubricant, when thrown upon them, instead of being conducted off over the ends of the guard and wasted, as would be the case if made straight, will be caused by such inclination to flow down upon the axle, and thence to the lubricant-receptacle in the journal-box, to be again used, and so on. As a still further preventive to the waste of the lubricant, I sometimes find it convenient to chamber or groove the under section of the guard around its recess $e$, as at $i$ in Fig. 12, leaving a small projection $i'$ to serve as a scraper to remove the lubricant from the axle, thus preventing it from approaching the joint between the section and the axle, and thereby its escape through the same.

In some cases it may be found desirable to cover the pocket, especially when the form employed is provided with a close bottom, and for this purpose I make use of a cover H, which is made of the proper length and shape to conform to the contour of the upper surface of the box A, and secure it in place by means of bolts $k\ k$, which pass through its ends and engage with suitably-shaped slots $k'\ k'$, formed in said box, as shown in Figs. 14 and 15, a strip of leather or other packing $l$ being interposed between the cover and the box to effectually close the space between them to the ingress of dust and other foreign substances.

The springs $f$ and $g$, for pressing the sections of the guard toward and upon the axle and for holding them in close contact with the walls of the pocket to insure a tight joint being maintained between them, respectively, may be of various forms. In the drawings I have shown both plate and coiled springs employed for these purposes, as well as the springs $f$, made integral with the encircling band C. The coiled form of spring is preferred, however, in practice, and the most desirable arrangement of which is shown in Figs. 5 to 8, wherein a series of conical coils $m$ are secured at their larger ends to a plate $n$ and are attached at their other or smaller ends to a second plate $n'$. When used to hold the sections of the guard pressed against the walls of the pocket, only a single series of coils will be employed, and the two plates will be flanged, as shown in Fig. 7, to entirely inclose the coils when compressed to their utmost limit; but when used to hold the section pressed upon the axle two series of coils will be employed, the larger ends of the coils of the two series being secured to opposite sides of the plate $n$, with their outer or smaller ends projecting in opposite directions where they are secured to other plates $n'$, as shown in Fig. 5.

The dust-guard pockets of journal-boxes being located in most instances directly above the outside rim of the car-wheel, it is evident that whatever lubricant escapes from the box at the dust-guard pocket will drop or be blown upon said rim, causing it to present an unsightly appearance. To obviate this objection, I find it convenient to incline the inner lower part $o$ of the journal-box downward toward the outer end of said box in order to conduct any lubricant which may escape around the dust-guard down this surface and away from the wheel, whence it will either drop or be blown without coming in contact therewith.

From the foregoing it will be seen that I not only provide simple and efficient means for preventing the escape of the lubricant from the journal-box, but also means whereby such lubricant if it does escape is carried away from the car-wheels and not deposited upon them, as is the case with the journal-boxes now in use, as well as other valuable features before alluded to and not necessary to be again repeated.

In the above I have described the best means contemplated by me for carrying my invention into practice; but I wish it distinctly understood that I do not limit myself strictly thereto, as it is obvious that I may modify the same in various ways without departing from the spirit thereof.

Having thus described my invention, what I claim as new, and desire to secure by Letters Patent of the United States, is—

1. A dust and lubricant guard consisting of an upper and an under section having the inner upper edge of the under section beveled from its inner side outward, whereby the lubricant thrown upon the inner side of the guard is caused to flow back along the same and is prevented from flowing through between the sections and becoming wasted, substantially as described.

2. A dust and lubricant guard consisting of an upper and an under section having the inner adjacent edges $h'$ of both sections beveled from their inner sides outward, whereby the lubricant thrown upon the inner side of the guard is caused to flow back along the same and is prevented from flowing through between the sections and becoming wasted, substantially as described.

3. A dust and lubricant guard consisting of an upper and an under section having the meeting edges of each inclined downward from its outer ends toward a point midway its length, whereby the lubricant thrown upon the inner side of the guard is caused by such inclined edges to flow down toward such point and its passage over the ends of the under section prevented, substantially as described.

4. A dust and lubricant guard consisting of an upper and an under section having the meeting edges of each inclined downward from its outer ends toward a point midway its length and beveled from the inner side of the section outward, whereby the lubricant thrown upon the inner side of the guard is caused to flow back along the same and is prevented from passing through between the sections and out over the ends of the under section, substantially as described.

5. A dust and lubricant guard consisting of an upper and an under section provided with a semicircular recess $e$ in each, the under section being chambered around said recess and provided with a scraper $i'$, substantially as described.

6. A journal-box for car-axles, having an orifice in its back and a pocket for the dust and lubricant guard open at top and bottom, and the back composed of flanges $a^2$ $a^2$, whereby the surface of the pocket against which the dust and lubricant guard bears is left open or bare for purposes of truing up, substantially as described.

7. A journal-box for car-axles, having an orifice in its back, a pocket for the dust and lubricant guard open at top and bottom, and provided on its inner wall with an inwardly-projecting hub $d$, substantially as described.

8. A journal-box for car-axles, having an orifice in its back, a pocket for the dust and lubricant guard, and the inner lower part inclined downward toward the outer end of said box, substantially as described.

9. The combination, with an axle and a journal-box provided with an open-bottomed pocket in its back, of a dust or lubricant guard composed of an upper and an under section arranged in said pocket, a band encircling such sections, and springs for forcing the side of the guard against the side of the pocket, whereby the guard, with its encircling band, is wholly supported as to its weight upon the axle and caused to move with it as a whole in the dust-guard pocket both vertically and laterally when in service, and a tight joint is insured between the side of the guard and the side of the pocket, substantially as described.

10. The combination, with a journal-box provided with a pocket in its back, a dust and lubricant guard composed of an upper and under section arranged in said box, a band encircling such sections, and springs interposed between said section and the band, of springs acting against the sides of the guard to force it against the side of the pocket to insure a tight joint between them, substantially as described.

11. The combination, with a journal-box having a pocket in its rear, provided with an inwardly-projecting hub $d$, and a dust and lubricant guard arranged in said box, of springs for acting against such guard to force it against said hub to insure a tight joint between them, substantially as described.

12. The combination, with a journal-box provided with a pocket in its rear, of a cover for said pocket, an interposed packing between the cover and the top surface of the box, and means whereby the cover may be forced down upon said surface and firmly held, substantially as described.

13. The combination, with a journal-box provided with a pocket in its rear and grooves in its upper surface, of a cover for said pocket, a packing-strip interposed between said cover and the top surface of the box, and bolts for forcing the cover down on such surface and firmly holding it in that position, substantially as described.

14. The combination, with a journal-box provided with a pocket in its rear, a dust and lubricant guard composed of an upper and under section, an encircling band, and interposed springs, of springs for acting against the side of such guard to force it against the side of the pocket to insure a tight joint between them and an interposed packing-strip, substantially as described.

15. The combination, with the flanged upper and under plates $n$ $n'$, of the series of conical coils arranged between them, substantially as described.

16. The combination, with the plate $n$, of two series of conical coils secured to its opposite sides and the plates $n'$, to which the other or smaller ends of such springs are attached, substantially as described.

17. The combination, with the journal-box having an orifice and a pocket open at top and bottom in its back, an axle, and a dust and lubricant guard for co-operating with such box and axle, composed of an upper and under section halved together at their meeting edges and beveled from their inner sides outward, of a band for encircling said sections, substantially as described.

18. The combination, with the journal-box having an orifice and a pocket open at top and bottom in its back, an axle, and a dust and lubricant guard for co-operating with such box and axle, composed of an upper and under section halved together at their meeting edges and beveled from their inner side outward, of a band for encircling said sections and springs interposed between the sections and the band, substantially as described.

In testimony whereof I have hereunto set my hand this 23d day of May, 1889.

WM. O. DUNBAR.

Witnesses:
WM. M. WITHEROW,
A. D. HOUCK.